(No Model.) 8 Sheets—Sheet 1.

H. G. O'NEILL.
CALCULATING, RECORDING, AND NUMBERING MACHINE.

No. 413,302. Patented Oct. 22, 1889.

Fig. 1.

WITNESSES:

INVENTOR
Henry G. O'Neill
BY
E. W. Anderson,
his ATTORNEY (No Model.) 8 Sheets—Sheet 2.

H. G. O'NEILL.
CALCULATING, RECORDING, AND NUMBERING MACHINE.

No. 413,302. Patented Oct. 22, 1889.

WITNESSES:

INVENTOR
Henry G. O'Neill
BY E. W. Anderson,
his ATTORNEY (No Model.) 8 Sheets—Sheet 3.

H. G. O'NEILL.
CALCULATING, RECORDING, AND NUMBERING MACHINE.

No. 413,302. Patented Oct. 22, 1889.

WITNESSES

INVENTOR
Henry G. O'Neill
by E. W. Anderson,
Attorney (No Model.) 8 Sheets—Sheet 4.

H. G. O'NEILL.
CALCULATING, RECORDING, AND NUMBERING MACHINE.

No. 413,302. Patented Oct. 22, 1889.

Fig. 4.

WITNESSES

INVENTOR
Henry G. O'Neill
by E. W. Anderson.
Attorney (No Model.) 8 Sheets—Sheet 6.

H. G. O'NEILL.
CALCULATING, RECORDING, AND NUMBERING MACHINE.

No. 413,302. Patented Oct. 22, 1889.

Fig. 6.

WITNESSES

INVENTOR
Henry G. O'Neill
by E. W. Anderson,
Attorney (No Model.) 8 Sheets—Sheet 8.

H. G. O'NEILL.
CALCULATING, RECORDING, AND NUMBERING MACHINE.

No. 413,302. Patented Oct. 22, 1889.

Fig. 16.

WITNESSES
M. B. Harris
C. R. Ferguson

INVENTOR
Henry G. O'Neill
by E. W. Anderson.
Attorney

UNITED STATES PATENT OFFICE.

HENRY G. O'NEILL, OF LOUISVILLE, KENTUCKY, ASSIGNOR, BY DIRECT AND MESNE ASSIGNMENTS, TO THE STANDARD RECORDER COMPANY, OF NEW YORK.

CALCULATING, RECORDING, AND NUMBERING MACHINE.

SPECIFICATION forming part of Letters Patent No. 413,302, dated October 22, 1889.

Application filed July 13, 1888. Serial No. 279,894. (No model.)

*To all whom it may concern:*

Be it known that I, HENRY G. O'NEILL, a citizen of Great Britain, and a resident of Louisville, in the county of Jefferson and State of Kentucky, have invented certain new and useful Improvements in Calculating and Recording Machines; and I do declare the following to be a full, clear, and exact description, of the invention, such as will enable others skilled in the art to which it appertains to make and use the same, reference being had to the accompanying drawings, and to letters or figures of reference marked thereon, which form a part of this specification.

Fig. 7 is a detail side view of one of the rack-slides Z. Fig. 8 is an edge view of the same. Fig. 9 is a detail view of gear-wheel Q and ratchet $a$, with its pawl X. Fig. 10 is a detail view of gear-wheel $a'$. Fig. 11 is a plan view of the arm $e$ and its connections. Fig. 12 is a detail end view of swinging frame G and its connections. Fig. 13 is a detail side view of the type-wheel. Fig. 14 is a detail view of one of the angle-keys J.

The object of this invention is to provide an accounting-machine adapted to facilitate money transactions by means of an accurate, uniform, and safe system of financial reckoning aided by printing devices, as hereinafter set forth.

In carrying out this invention I have provided, in conjunction with a series of movable indicators, each marked with the nine digits and a cipher, a single key for each digit-indicator, operating or gear-turning mechanism common to the nine digit-keys, and a series of notation-keys governing the operation of the digit keys and indicators, whereby the movable indicators may be operated after the proper notation-key has been moved to effect the engagement of its indicator with the operating mechanism of the digit-keys; and it will be apparent that the details of the mechanical embodiment may be varied in different ways without departing from the principles herein explained.

In the accompanying drawings mechanism is shown illustrating this invention.

A designates the base, upon which is secured a frame holding the mechanical device.

B represents the notation-keys, designed to shift the digit-wheels C, mounted on studs $c$, from their free position into engagement with the pinions D on the shaft E, which is journaled at its inner end in a slide U and is provided with a pinion D for each digit-wheel.

Figure 2:
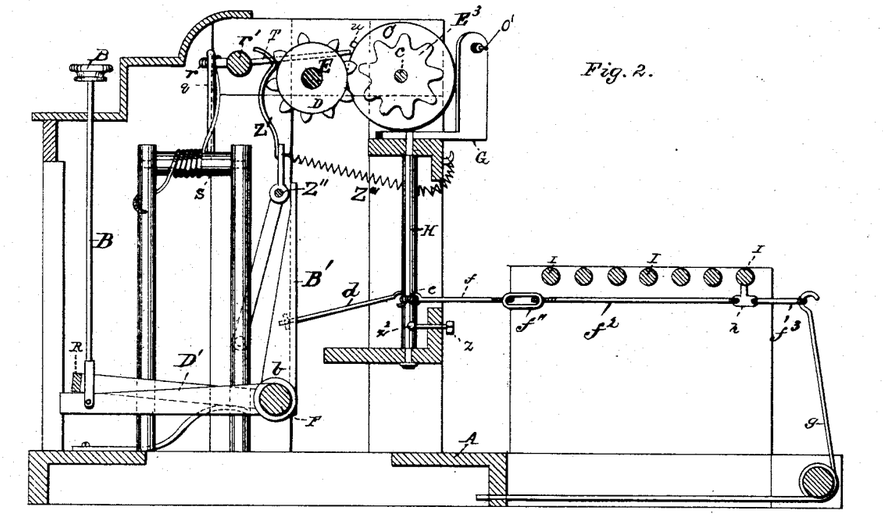
Fig. 2 is a transverse section on the line 2 2 of Fig. 1.
Figure 3:
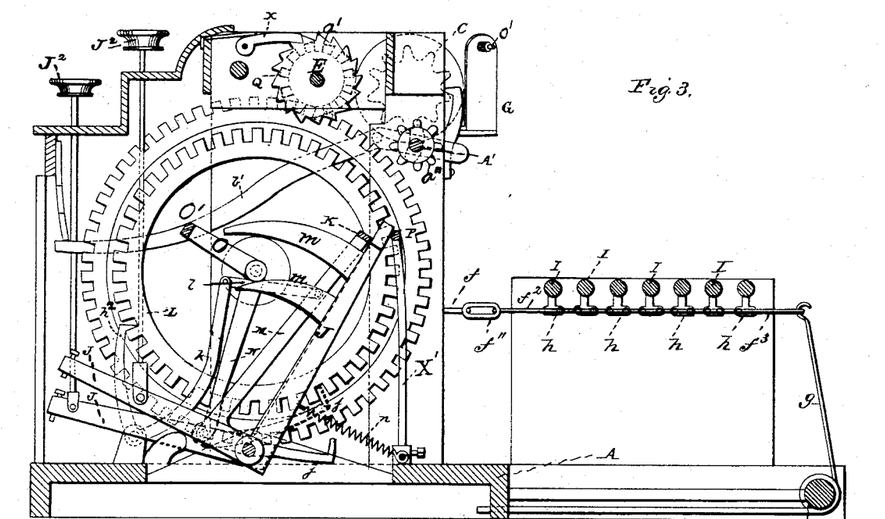
Fig. 3 is a transverse section on line 3 3, Fig. 1.
Figure 4:
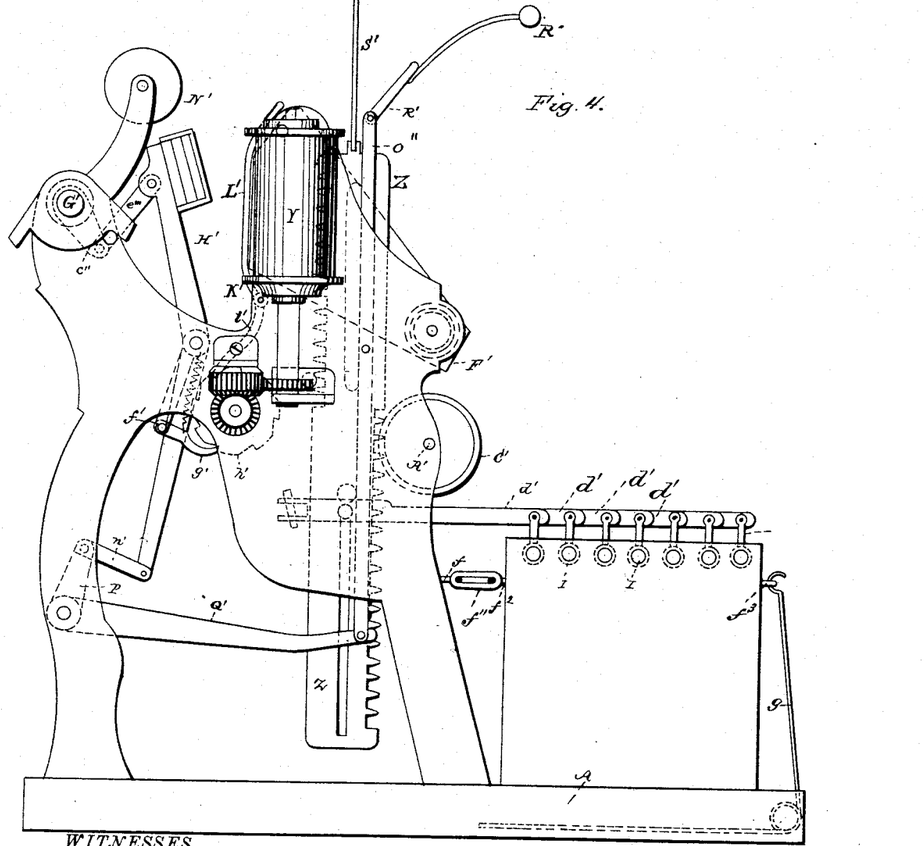
Fig. 4 is an end view.
Figure 5:
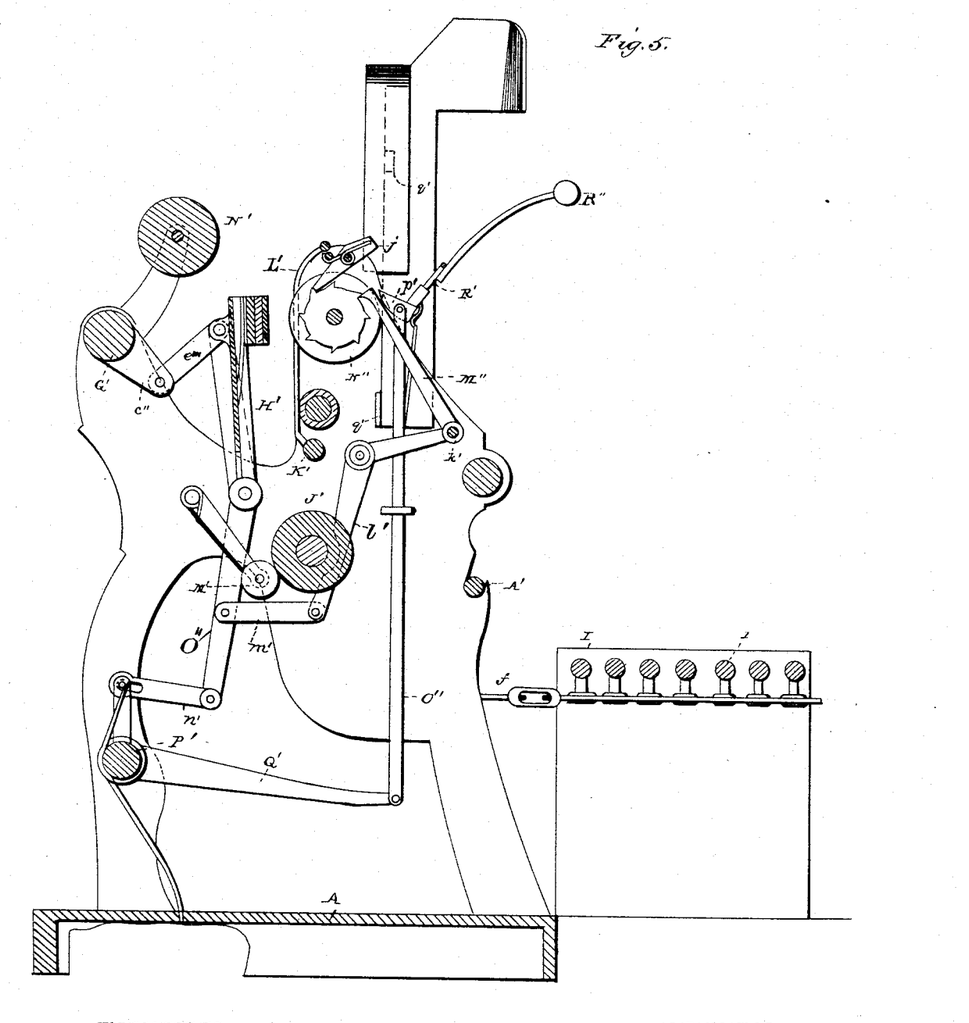
Fig. 5 is a transverse section on line 5 5, Fig. $1^a$.

As hereinafter explained, the shaft E is operated by any of the nine digit-keys J through the medium of a gear-turning mechanism which is common to said nine keys, and in the action of the machine the notation-key is moved to draw the proper indicator into engagement with the shaft E, and thereby into engagement with the mechanism set in motion by the digit-key, said mechanism being common to all the digit-keys, as aforesaid. The finger-pieces of the notation-keys B are preferably of three different colors—that is to say, the first two may have white tops to indicate cents, the next three, indicating hundreds, may be colored red, and those on the left may be blue. The object in so coloring the notation-keys is to enable the operator readily to locate the figures in the ledger form, for the value of the digit indicated is governed by the notation-key depressed when the key of said digit is operated. The lower end of each notation-key is pivoted to one of the outwardly-extending arms of its angle-lever $D'$, which has its bearing on the longitudinal rod F. The digit-wheels C are arranged in notation series, each wheel corresponding to a notation-key and to a pinion D on the shaft E, and each digit-wheel is journaled on a stud $c$, which projects at right angles from a yoke or swinging frame G, which has a depending stem H pivoted in a bearing of the frame of the machine. (See Figs. 2 and 12.) The digit-wheels C normally stand at an acute angle with the shaft E, so that the gear-wheels $E^3$ on the sides of said digit-wheels are not in engagement with the pinions D of said shaft. Nevertheless the line of digit-wheels is parallel to said shaft, and in order to bring any digit-wheel into engagement the corresponding notation-key B is depressed, moving its angle-lever D', and, through the medium of a link $d$ and an arm $e$, which projects from the depending stem H of the swinging yoke or frame G, the frame is turned sufficiently to bring the gear $E^3$ and the digit-wheel into engagement with a pinion D of the shaft E. This movement of the notation-key B at the same time disengages a locking arm or pawl Z' from a pinion D on said shaft, so that the pinion is free to turn when moved by the gear-turning mechanism of the digit-keys J. Any digit-wheel C may now be turned by operating the shaft E, and while the turning of the shaft is regulated by the gear-turning mechanism common to all the digit-keys J its extent is governed by the digit-key put in action, so that the shaft is turned just enough to move the digit or indicator wheel C sufficiently to show the proper digit uppermost or in the reading position. The lock-arm Z' is operated by the spring-controlled bar Z'', which is moved by the angle-lever D' of any notation-key of the series. Each depending stem H is provided with a stop-arm $z^2$, which engages a regulating set-screw $z$, so that the angular position of the swinging yoke G and its digit-wheel C can be regulated. (See Fig. 11.) From the arm $e$ of each stem H extends a threaded rod $f$, which is connected by a right and left threaded link $f''$ to a threaded rod $f^2$, which is attached to a depending arm $h$ of one of a series of rock-shafts I, which have their bearing in the main frame. The returning-spring $g$ is connected to the depending arm $h$ of said rock-shaft by a link $f^3$.

Figure 1:
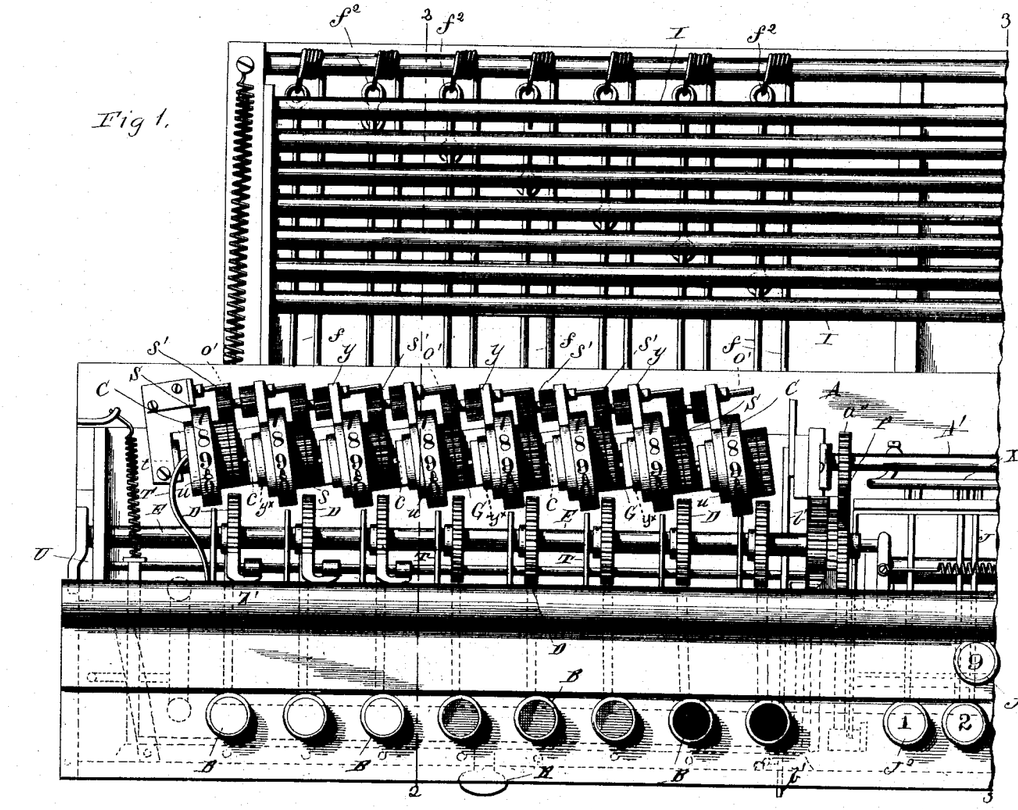
Figures 1 and $1^a$ are half plan views of my improved calculating and recording machine, the two forming a plan view of the entire machine.
Figure 1A:
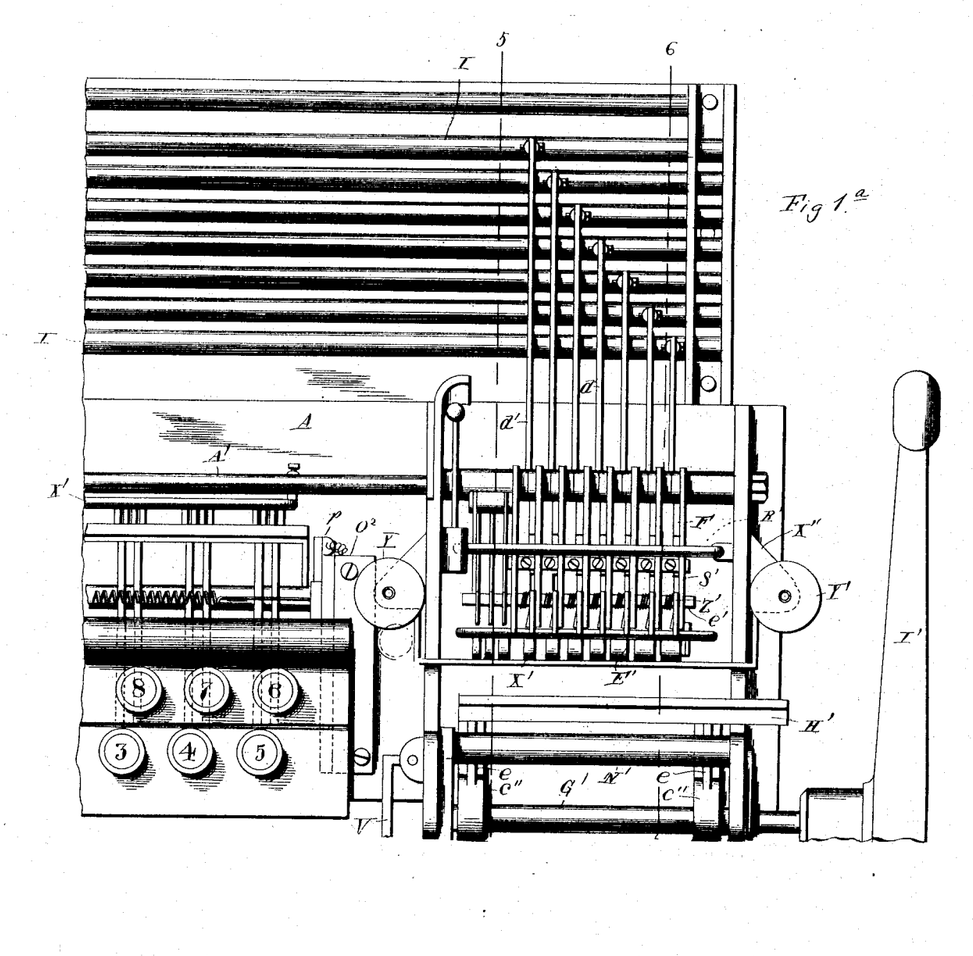
Figure 6:
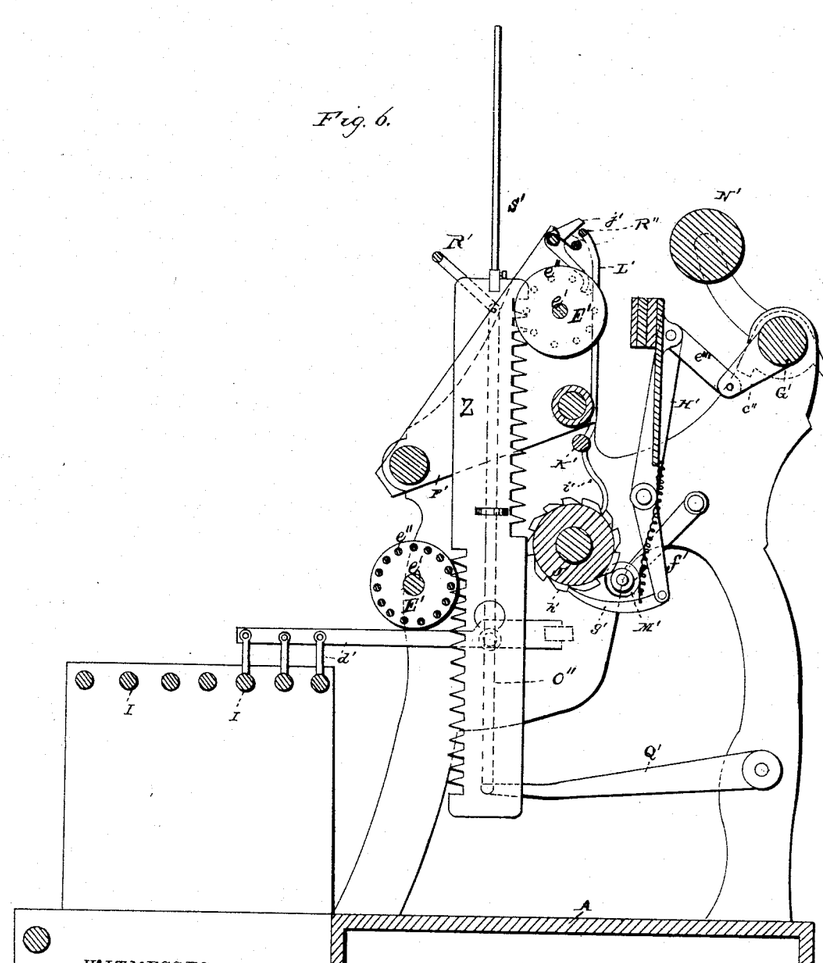
Fig. 6 is a transverse section on the line 6 6, Fig. $1^a$. Fig. $6^a$ is a detail view of the elongated gear $C'$.
Figures 6A, 7, 8, 9, 10, 11, 12, 13, 14:
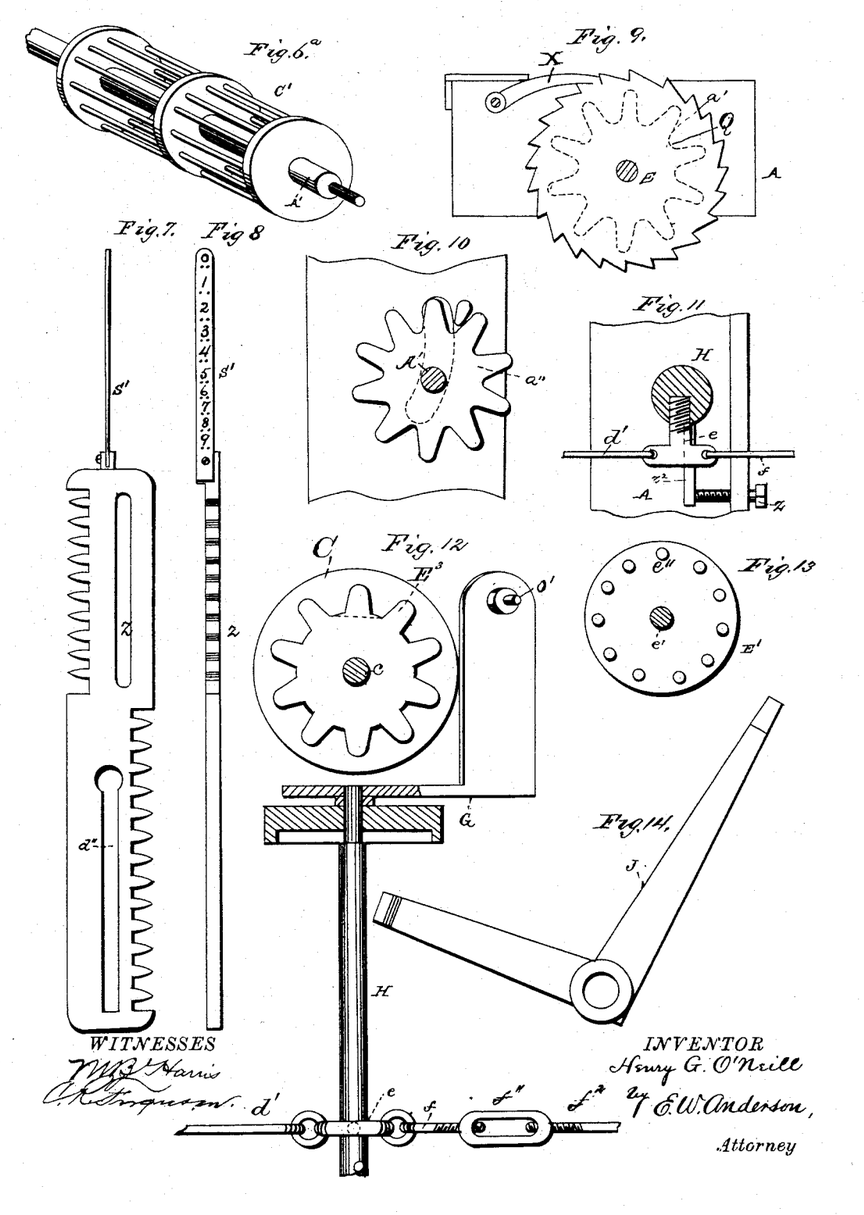

J designates the digit-keys, which are of angle-lever form, as seen in Fig. 14, and are adapted to strike against and move the bail-shaped bracket-lever K, (see Fig. 1,) which is provided with an operating-dog $h^2$ to engage the gear-wheel L, said dog being connected to said lever by means of an arm $k$ and a link $l$. This gear-wheel L is journaled on a pin of the main frame. The finger-pieces $J^2$ of the digit-keys J are marked from 1 to 9, consecutively, and the operation of any key moves the bracket-lever K sufficiently to cause its dogs $h^2$ to turn the gear-wheels L and P the number of teeth corresponding to the number of the digit-key, and thereby to turn the pinion-shaft E through the medium of its pinion Q. The wheels L and P constitute but one element. I employ the two to distribute the wear on the teeth. The lever K is common to all the digit-keys J and has its arms M pivoted to the arms N of the supplementary bail-lever O, which is journaled on pins of the frame in the line of the axis of the gear-wheel L. When the bail-shaped bracket-lever K is thrown forward by the operation of a digit-key, the pivoted dog $j$, connected to the arm of said bail-shaped bracket-lever, is released from the gear L, and the bail-lever O is also thrown forward by the arms M of lever K until its longitudinal portion O' strikes the curved stop, projection, or finger $m$ on the vertical arm of the key J. At the same time the dog $j$ moves the gear L and the auxiliary gear P, meshing with the pinion Q of the shaft E thereof, rotating said shaft and turning any one of the digit-wheels which may have been brought forward, by its notation-key into engagement with a pinion of said shaft. Upon returning to its first position the arm M of the main bail-shaped bracket-lever K is arrested by striking the key J, the latter being arrested by the stop X', suitably disposed in position, preventing further movement in the direction of said lever, and the bar $z''$, carrying the lock-arm Z', being relieved when the notation-key is released, is drawn by its spring Z''' back into engagement with a pinion D of the shaft E. A pivoted retaining-pawl X engages a ratchet $a'$, fixed on the shaft E, and prevents said shaft from turning in the opposite direction.

A spring $n$ is secured to each digit-key J and to the frame for the purpose of returning said key to its normal position when released, and a spring $O^2$, (see Fig. 1,) connected to the framing and to a rock-arm $p$, which is connected to the depending arm M of the bail-shaped bracket-lever K, serves to return said lever to its normal position. When, therefore, the notation-key B is pressed downward to bring one gear of its digit-wheel into engagement with the pinion on the shaft E and the proper digit or numbered key J is depressed, the gear of said digit-key J is set in action to rotate the shaft E, thus revolving the digit-wheel C until the number corresponding to the digit-wheel of the key is brought uppermost to the sight-slot of the casing, provided, however, that on starting the movement the zero-mark of the digit-wheel be uppermost or at said sight-slot. The mental work in finding the digit-key is reduced to minimum, as there is but one key for each digit, although the digit-wheels may be of any required number. The entire series of digit-wheels may be brought into engagement with the pinions on the shaft E by pressing downward the resetting-lever R, which is in bail form and has a longitudinally-extending bar which bears upon the arms of the angle-lever D' of the notation-keys B. The lever R is connected to a spring-controlled rock-shaft S, which is provided with an arm $q$ and connection $r\ r'$ to the slide U, so that when the resetting-lever R is depressed the slide U and the shaft E journaled therein are moved longitudinally, so that the pinions D of said shaft will come into engagement with the mutilated gears between the digit-wheel and the outer full gear $E^3$ of said wheels. Then by operating the digit-key 9 the entire series of digit-wheels will be rotated until each pinion D on the shaft E enters the interval of the mutilated gears, thus bringing all of the digit-wheels to rest with zero uppermost or at the sight-slot of the casing. The small pinion $s'$, journaled in the swinging frame G on the rear of each digit-wheel, is designed to move the adjacent digit-wheels one step in carrying the numeration above 9 as the projecting carrying-pin $o'$ on the digit-wheel strikes one of the cogs of said pinion S', and the polygonal scalloped brake $y$ is secured at the side of the pinion $s'$ to bear against a notched disk $y^x$ on the digit-wheel, and prevent the pinion and the wheel engaged therewith from moving more than one point. The fingers T on the shaft-moving frame U are designed to act as stops for the digit-wheels when the pins $u$ on said wheels come in contact therewith in resetting the digit-wheels to zero, and the finger T' on the shaft-moving slide U is designed, by striking against the lateral lug $t'$ on the last digit-wheel C, to stop said wheel when the numeral 9 shall be upward, thus limiting the notation and preventing the operator from running the series out and commencing another.

The recording devices hereinafter described are actuated by the notation-keys B and digit-keys J, except when a disengagement is effected.

A' indicates a shaft journaled on the frame, and having at one end the pinion $a''$, which is adjustable in and out of gear with the wheel P by the movement inward and outward of the pivoted lever $b'$. The opposite end of this shaft is provided with a lantern or elongated gear C', which engages the teeth on the lower portion of the rack-slides Z, which are thrown into engagement by the rock-shafts I when the latter are operated by the mechanism heretofore described in conjunction with the links $d'$, each pivoted at one end to a rock-shaft, and each having a lug $c'$ in engagement with a slot $d'$ in a rack-slide Z. The front edge of each rack-slide is toothed, as shown in Figs. 4, 6, 7, and 8, to engage the teeth $e''$ on the type-wheels E', which are journaled on a shaft $e'$, extending through the frame-work.

G' is a shaft journaled in the frame, and having arms $c''$ pivoted to links $e'''$ on the swinging frame H' or platen, which is designed to press the paper to be printed upon against the type-ribbon when the lever I' on the said shaft G' is turned upward. When the lever I' is returned to its normal position, the arm $f'$ on the frame H' brings the spring-controlled pawl $g'$ pivoted thereon into engagement with the ratchet $h'$ on the paper-roller J' and turns the same, and as the roller J' is rotated the arm $i'$ on the rock-shaft K' rides upon the edge of the ratchet-wheel $h'$, and, being operated by the beveled backs of its teeth, carries a bail-lever L' rearward against the upper end of the pivoted spring-controlled pawls $j'$, releasing the lower ends of said pawls from the teeth of the type-wheels and allowing the rack-bar to fall by gravity and return the type-wheels to zero.

M' is a spring-controlled pressure-roller designed to hold the paper against the feed-roller J', and N' is the upper roller over which the paper is received from the spool. Pawls M'', designed to operate the numbering-wheels N', are connected to the pivot-shaft K', which has the angle-lever $l'$, connected to the arm O'' by the link $m'$. Said pawls M'' engage the ratchets on the side of the numbering-wheel N'' and rotate the same one step at each upward motion, making the proper carrying changes from units to tens and from tens to hundreds, so that all the money transactions recorded by the machine may be consecutively numbered.

In order to make the changes in carrying above referred to, the ratchet on the units-wheel has one of its notches cut deeper than the others, and the tens-wheel is also provided with a deep notch, and the pawl-points are arranged at different pitch, so that the units-pawl is on the lowest plane. Therefore the units-pawl rotates the units-wheel nine points, and on the tenth drops into the deep notch and rotates the tens-wheel one point, and this is continued until the number 99 is reached, when both the units-pawl and the tens-pawl drop into deep notches of their wheels and allow the third pawl to engage and rotate the hundreds-wheel one point to mark or print 100. The lower end of the arm O'' is connected by a link $n'$ to the rock-shaft P', which has rearwardly-extending arms Q', pivoted to the vertical rods $o''$, having guide-bearings in the frame, and the upper ends of the rods $o''$ are connected to the bell-hammer R'' by a pivoted bar R', which has at one end the trip-dog $p'$, adapted to operate the bell-hammer R'' by striking the trip-lug $q'$. The bar R' is designed also as a follower to insure the falling of the rack-slides Z pressing downward on the upper ends thereof during its falling movement. When several transactions are to be recorded, the indicators S', in connection with the rock-shafts, will show the amount of each transaction, and when the transactions are all recorded the digit-wheels will indicate the sum of all the transactions. The inked ribbon X'' is moved on the spools or spindles Y Y', which have a bevel-gear connection with the journal of the paper-roller, so that the ribbon is automatically fed across the face of the type-wheels, and when the movement of the ribbon is to be reversed the spindles Y may be thrown out of gear by means of the shifting-lever V, which operation brings the spindle Y' into engagement.

The machine is designed to be inclosed in a case provided with safety-locks, so that when the case is locked the machine cannot be tampered with. The only parts which are designed to appear outside of the incasement are the finger ends of the notation-keys B and of the digit-keys J and the handle I' of the printing-platen. The resetting-lever R is within the case.

Figure 15:
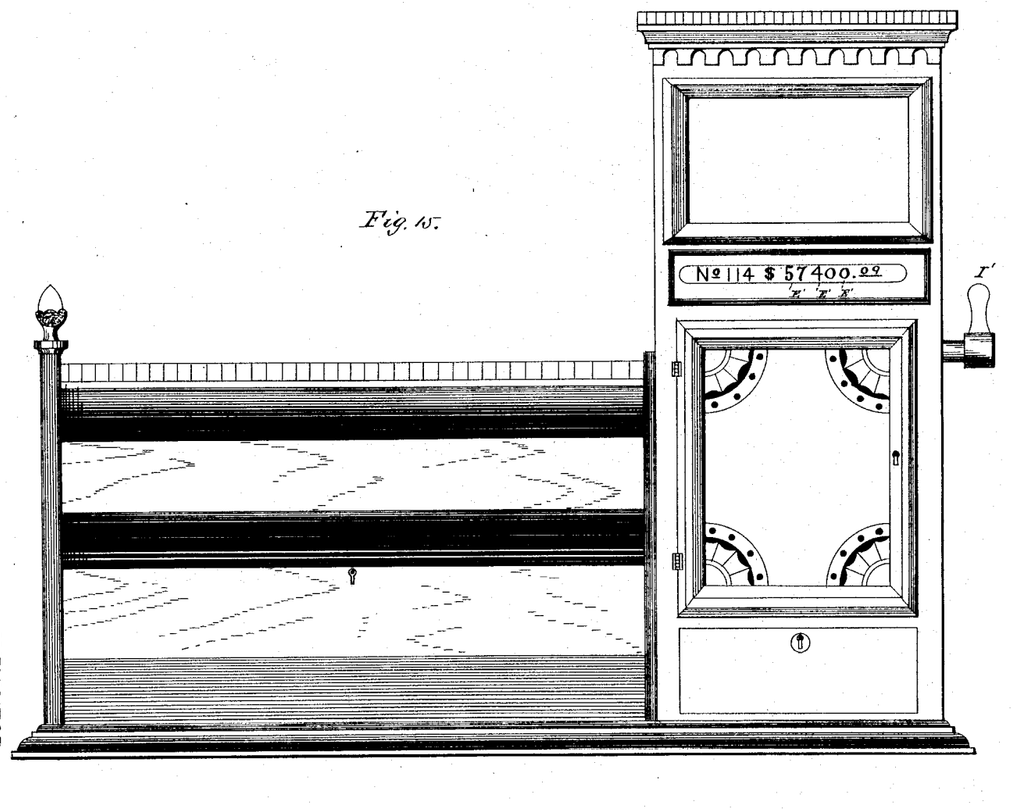
Fig. 15 is a front view of the machine as housed.

Illustrating one use of the machine, I have shown, as will be observed in Fig. 15, the amount $57,400, representing a certain transaction, which may be either a receipt or a disbursement, and preceding and in alignment with these figures are arranged the figures 114, standing for the consecutive number or order of said transaction as practiced, for instance, in a banking institution. Assuming it is desired to add 3 to the digit previously brought uppermost, which in this instance, say, is 4, the required digit-key 3 is depressed and the digit-wheel is by that action caused to rotate until 7 is brought uppermost. The lever I' is now actuated so as to cause the platen to press the paper against the type-ribbon, receiving and making the required impression of the said number or figure 7. The lever I' now being released, the type-wheel is permitted to rotate and present zero uppermost, ready for the repetition of a like operation.

In some calculators heretofore invented it has been found necessary to rely upon the accuracy of sight and nerve of the operator to measure the movement to bring the notation-key to the proper digit-mark, said marks being arranged upon a scale and requiring that the operator should look for each mark and move the lever exactly far enough to bring it opposite such marks, so that there is liability of error in setting down a number even when the proper key is moved. In my invention, there being separate keys for the notation and for the digits, no such measurement of movement is necessary, and as the keys are all operated by simple pressure the liability of the operator to erroneous movement is reduced to a minimum. With the same object in view the movement of the digit-key is rendered of no effect until the notation or denomination key which guards the same has been operated, and the movement of the notation-key has no effect until the digit-key is brought into action. The notation-keys B are arranged in regular series and colored to form a plain guide, and the combination with the digit-keys is so simple that any number can at once be set down without possibility of error if the proper notation-key and digit-key are pressed down.

By means of these machines all financial papers may be numbered and stamped with their values. A regular record may be kept showing each transaction by its consecutive number and value, and the sum of all the transactions may be known at any time by referring to the result indicated at the sight-slot of the calculator. If two of these machines are employed, one for the incoming sums and the other for the outgoing value, a balance can be stricken at any time by referring to the sums indicated by the calculators at the sight-slots of the machine.

Having described my invention, what I claim is—

1. The combination, with a calculating-machine having digit-keys and gearing operated by said digit-keys to move the digit wheels or indicators, the said digit wheels or indicators, the notation-keys, and shifting devices effecting the engagement of said digit-wheels, of a numbering-machine and indicating and recording devices in shifting-connection with the gearing operated by said digit-keys, substantially as specified.

2. In an accounting-machine, the combination, with a series of digit wheels or indicators, gear-turning mechanism, and a series of digit-keys independently engaging said gear-turning mechanism, adapted to move any digit wheel or indicator of the series, of a series of notation-keys and shifting devices adapted to move any digit-wheel of said series into engagement with said mechanism, substantially as specified.

3. In an accounting-machine, the combination, with a series of digit-keys and a series of digit wheels or indicators, of gear-turning mechanism common to all of and independently engaged by each of said digit-keys and a set of notation shifting-keys governing the operation of the gear-turning mechanism upon the digit wheels or indicators, substantially as specified.

4. In an accounting-machine, the combination, with a series of notation shifting-keys and a corresponding series of digit wheels or indicators in connection therewith, of a set of digit-keys adapted separately to act in conjunction with any or all the notation-keys of the series, substantially as specified.

5. In an accounting-machine, the combination, with a set of digit-keys, gearing operated thereby, and digit wheels or indicators normally disengaged from said gearing, of a series of notation-keys and shifting-connections whereby the digit wheels or indicators of any notation-column are brought into engagement with said gearing operated by said digit-keys, substantially as specified.

6. The combination, with a series of geared digit-wheels and the gear-turning mechanism and the digit-keys independently engaging the same, of the series of digit-wheels, their notation-keys, and shifting-connections, whereby any digit-wheel of the series is brought in engagement with said gear-turning mechanism by its notation-key for operation by any digit-key of the series, substantially as specified.

7. In an accounting-machine, the combination, with the digit-wheels, their gearing, the resetting-slide, and its pinion-shaft, of the series of digit-keys, the gear-turning mechanism operated by said digit-keys, the series of notation-keys, and the resetting-lever adapted to operate all of said notation-keys simultaneously to bring the digit-wheels in gear with the pinions of said pinion-shaft, substantially as specified.

8. A pivoted digit-wheel and a shifting-frame carrying said pivoted digit-wheel and provided with a returning spring and gear, in combination with digit-wheel-shifting mechanism, a notation-key adapted to effect the engagement of its wheel with the digit-wheel-setting mechanism, and digit-keys operating through said turning mechanism to actuate the digit-wheel when set, substantially as specified.

9. The combination, with the digit-gear-turning mechanism and its keys, of the digit-wheels having each a full and mutilated gear-wheel, the swinging frames of the digit-wheels, their returning-springs and notation-keys, and the resetting-slide and pinions thereon, substantially as specified.

10. The combination, with the digit-wheels and their swinging frames and returning-springs, of the digit-keys and gearing, and a rotary shaft parallel to the line of digit-wheels and carrying a series of pinions normally out of engagement with the gear of the digit-wheels, and notation-keys connected to said swinging frames, whereby the latter are brought into engagement with the pinions of said rotary shaft, substantially as specified.

11. The combination, with the digit-gear-turning mechanism and a rotary pinion-carrying shaft and the digit-keys, of the swinging digit-wheels having stop-pins and returning-springs, the notation-keys, the stop-fingers, a resetting-lever, and mechanism adapted to operate said pinion-carrying shaft and its pinions when the resetting-lever is pressed, substantially as specified.

12. The combination, with a series of digit-wheels and the notation-keys for bringing them to engagement position, of the digit-gear-turning mechanism, a pinion and the pinion-carrying shaft, an automatic stop normally engaging said pinion-carrying shaft, and the digit-keys, substantially as specified.

13. The combination, with the digit-gear-turning mechanism and the independent digit-keys having stop projections, of a main toothed wheel, a bail-lever common to all the digit-keys and having its arms pivoted to the arms of a supplementary bail-lever journaled or pivoted in the axial line of said wheel, an actuating-pawl connected to said bail-lever, a holding-pawl, a spring returning device connected to the keys and bail-lever, and a stop, substantially as set forth.

14. In an accounting-machine, the combination of a set of digit-keys, gear-turning mechanism common to all of said keys, a pawl, a bail-lever, mechanism actuating said gear-turning mechanism, the locking-pawl for the gear-turning mechanism, the notation-keys, their levers, and the shifting-frames connected to said levers and carrying the digit-wheels, substantially as specified.

15. The combination, with adjustable digit-wheels and rack-indicators, of a set of digit-keys, their common gear-turning mechanism, the notation shifting devices, the pinion-shaft, and the means common to all said notation shifting devices for guarding the action of said digit-keys, substantially as specified.

16. The combination, with movable or shiftable digit wheels or indicators arranged in series and a corresponding series of notation-keys having shifting devices in connection with said digit wheels or indicators, of a single series of digit-keys and gear-turning mechanism common to all said digit-keys and normally disengaged from said digit wheels or indicators, but adapted to operate the same when engaged therewith by means of the notation-keys, substantially as specified.

In testimony whereof I affix my signature in presence of two witnesses.

HENRY G. O'NEILL.

Witnesses:
C. R. FURGUSON,
JNO. GILMOUR.